United States Patent
Shinohara (10) Patent No.: US 9,706,193 B2
(45) Date of Patent: Jul. 11, 2017

(54) DISPLAY DEVICE

(71) Applicant: OMRON Corporation, Kyoto (JP)

(72) Inventor: Masayuki Shinohara, Kyoto (JP)

(73) Assignee: OMRON Corporation, Kyoto (JP)

(*) Notice: Subject to any disclaimer, the term of this patent is extended or adjusted under 35 U.S.C. 154(b) by 110 days.

(21) Appl. No.: 14/812,772

(22) Filed: Jul. 29, 2015

(65) Prior Publication Data

US 2016/0057411 A1    Feb. 25, 2016

(30) Foreign Application Priority Data

Aug. 25, 2014    (JP) ................. 2014-170860

(51) Int. Cl.
     *H04N 13/04*      (2006.01)

(52) U.S. Cl.
     CPC ..... *H04N 13/0452* (2013.01); *H04N 13/0443* (2013.01)

(58) Field of Classification Search
CPC ............... G09G 2300/023; G09G 5/14; G09G 2320/02; G09G 2320/028; G09G 2320/0646; H04N 13/0418; H04N 13/0454; H04N 13/0456; H04N 13/0409; H04N 13/00; H04N 13/0411; H04N 13/0447; H04N 13/045; H04N 13/0497; H04N 2013/0463; G02B 27/2264; G02B 27/2214; G02B 27/2278; G02B 27/26; G02B 6/00; G02F 1/1323; G02F 1/1347
See application file for complete search history.

(56) References Cited

U.S. PATENT DOCUMENTS

| | | | | |
|---|---|---|---|---|
| 8,144,390 B2* | 3/2012 | Nam | ................. | G02B 27/2214 359/298 |
| 2006/0072006 A1* | 4/2006 | Lin | ..................... | H04N 13/0409 348/51 |
| 2007/0146845 A1* | 6/2007 | Hirabara | ............ | G02B 27/2264 359/23 |
| 2010/0289819 A1* | 11/2010 | Singh | ..................... | G09G 3/003 345/619 |
| 2011/0124376 A1* | 5/2011 | Kim | ........................ | G06F 1/1626 455/566 |
| 2011/0157167 A1* | 6/2011 | Bennett | ..................... | G06F 3/14 345/419 |
| 2012/0147059 A1* | 6/2012 | Chen | ................... | G02B 27/2214 345/690 |
| 2013/0027619 A1* | 1/2013 | Hsiao | ..................... | G02B 27/26 349/13 |
| 2015/0228229 A1* | 8/2015 | Priede | .................... | G09G 3/003 345/213 |

FOREIGN PATENT DOCUMENTS

JP      2013-011691 A      1/2013

* cited by examiner

*Primary Examiner* — Sultana M Zalalee
(74) *Attorney, Agent, or Firm* — Osha Liang LLP (57) ABSTRACT

A display device has a display panel that switches a display region of a two-dimensional image between a transparent state in which the two-dimensional image is not displayed to be transparent and an opaque state in which the two-dimensional image is displayed to be opaque, and a stereoscopic projection device arranged on a back surface side of the display panel. The stereoscopic projection device projects a stereoscopic projection image to a position overlapping the display region of the display panel when viewed from a front surface side.

4 Claims, 5 Drawing Sheets

DISPLAY DEVICE

CROSS-REFERENCE TO RELATED APPLICATION

This application claims priority to Japanese Patent Application No. 2014-170860 filed with the Japan Patent Office on Aug. 25, 2014, the entire contents of which are incorporated herein by reference.

BACKGROUND

Field

The present invention relates to a display device that can display a stereoscopic image and a two-dimensional image.

Related Art

Recently, a display device that can display the stereoscopic image and the two-dimensional image while switching between the stereoscopic image and the two-dimensional image is proposed in order to enhance a realistic sensation of an observer (for example, see Unexamined Japanese Patent Publication No. 2013-11691).

For example, a stereoscopic image display device disclosed in Unexamined Japanese Patent Publication No. 2013-11691 forms the stereoscopic image using light emitting elements that are arranged in at least a part of a plurality of light emitting element arrangement layers in a stereoscopic display mode, and the stereoscopic image display device forms a flat image using the light emitting elements only in a common layer in a flat display mode.

SUMMARY

However, the stereoscopic image display device disclosed in Unexamined Japanese Patent Publication No. 2013-11691 does not simultaneously display the stereoscopic image and the two-dimensional image.

One or more embodiments of the present invention provides a display device that can simultaneously display the stereoscopic image and the two-dimensional image.

According to one or more embodiments of the present invention, a display device includes: a display panel that can switch a display region of a two-dimensional image between a transparent state in which the two-dimensional image is not displayed to be transparent and an opaque state in which the two-dimensional image is displayed to be opaque; and a stereoscopic projection device arranged on a back surface side of the display panel, the stereoscopic projection device projecting a stereoscopic projection image to a position overlapping the display region of the display panel when viewed from a front surface side.

According to one or more embodiments of the present invention, the display device further includes a controller configured to put the display region of the display panel into the opaque state in a first period, and to put a region of the display region of the display panel into the transparent state in a second period different from the first period, the region overlapping at least the stereoscopic projection image, the controller alternately switching between the first period and the second period. At this point, according to one or more embodiments of the present invention, the first period is shorter than a duration of a residual image of the stereoscopic projection image projected in the second period, and the second period is shorter than a duration of a residual image of the two-dimensional image displayed in the first period.

According to one or more embodiments of the present invention, the controller lengthens the first period as compared with the second period.

According to one or more embodiments of the present invention, luminance of the stereoscopic projection image projected by the stereoscopic projection device is higher than luminance of the two-dimensional image displayed on the display panel.

According to one or more embodiments of the present invention, the stereoscopic projection device projects the stereoscopic projection image to a position overlapping the display panel in a depth direction. According to one or more embodiments of the present invention, the display device further includes a controller configured to put a first partial region of display region of the display panel into the transparent state, the first partial region including a part overlapping the stereoscopic projection image, and to put a partial region other than the first partial region of the display region into the opaque state.

The display device according to one or more embodiments of the present invention has an effect to simultaneously display the stereoscopic image and the two-dimensional image.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

A display device uses a display panel having a display region that can switch between a transparent state in which a two-dimensional image is not displayed to be transparent and an opaque state in which the two-dimensional image is displayed to be opaque. In the display device, a period during which the display region of the display panel is put into the transparent state to make a stereoscopic projection image visible through the display region of the display panel, the stereoscopic projection image being projected by a stereoscopic projection device arranged on a back surface side with respect to the display panel, and a period during which an image is displayed on the display panel to make the stereoscopic projection image invisible are alternately switched in a short time to allow an observer to visually recognize the stereoscopic projection image and the two-dimensional image at the same time.

Hereinafter, for convenience, it is assumed that the side facing the observer is a front surface while an opposite side to the front surface is a back surface. A direction oriented toward the front surface side from the back surface side across the display panel or an opposite direction thereto is referred to as a depth direction.

Figure 1:
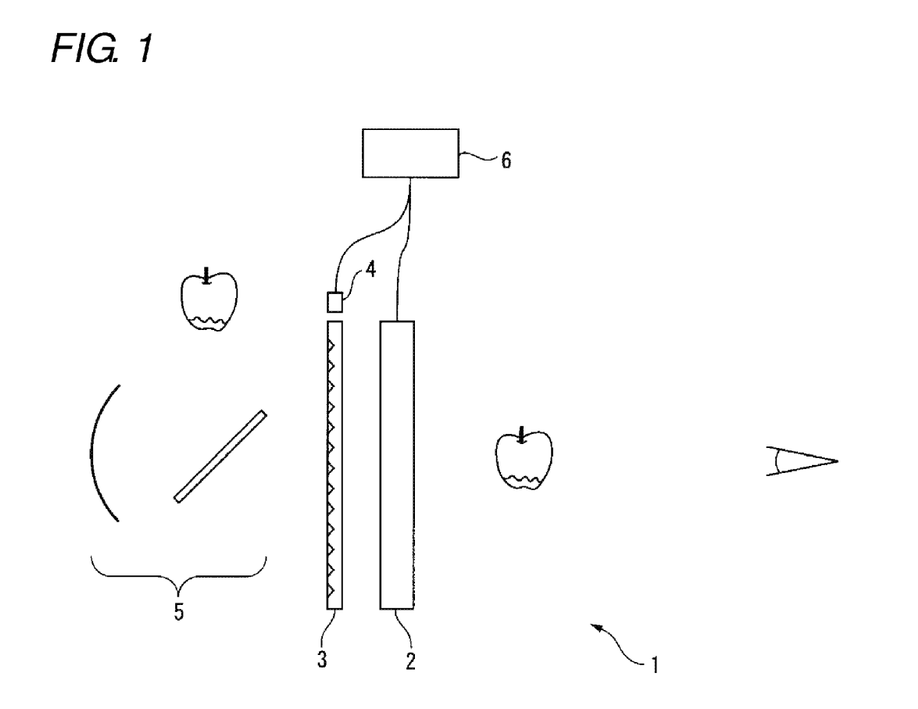
FIG. 1 is a schematic configuration diagram illustrating a display device according to one or more embodiments of the present invention.

FIG. 1 is a schematic configuration diagram illustrating a display device according to one or more embodiments of the present invention. A display device 1 includes a liquid crystal panel 2, a light guide plate 3, a light source 4, a stereoscopic projection device 5, and a controller 6.

The liquid crystal panel 2 and the light guide plate 3 are examples of the display panel that can display the two-dimensional image and switch between the transparent state and the opaque state. For example, the liquid crystal panel 2 includes a liquid crystal layer in which liquid crystal molecules are sealed, two transparent electrodes, two transparent substrates, and two polarizing plates. The two transparent electrodes made of ITO are arranged so as to face each other with the liquid crystal layer interposed therebetween. The two transparent substrates made of glass or transparent resin are arranged so as to face each other with the liquid crystal layer and the transparent electrode interposed therebetween. The two polarizing plates are arranged so as to face each other with the liquid crystal layer, the transparent electrode, and the transparent substrate interposed therebetween. An oriented film may be formed between the liquid crystal layer and the transparent electrode in order to control orientations of the liquid crystal molecules. One of the transparent electrodes may be formed in a matrix state so as to be able to adjust a voltage applied in units of pixels.

For example, the two oriented films orient the liquid crystal molecules of the liquid crystal layer toward a predetermined direction. For example, in the case that the liquid crystal molecules included in the liquid crystal layer are arrayed into a twist nematic type, the two oriented films are arranged such that the orientations of the oriented films are orthogonal to each other. Each of the two polarizing plates is an element that transmits a polarization component having a polarization plane in a specific direction. For example, the two polarizing plates are arranged such that transmission axes of the polarizing plates are orthogonal to each other in order to cause the crystal panel 2 to operate in a normally white mode. Unless an electric field is applied between the transparent electrodes between which the liquid crystal layer is interposed, a polarization direction of the light transmitted through the polarizing plate arranged on a back surface side rotates in the liquid crystal layer by 90°. Therefore, the light can be transmitted through the polarizing plate arranged on a front surface side. Therefore, the liquid crystal panel becomes transparent. On the other hand, when an electric field is applied between the two transparent electrodes between which the liquid crystal layer is interposed, the polarization plane of the light transmitted through the liquid crystal layer does not rotate because the liquid crystal molecules in the liquid crystal layer are oriented toward a direction parallel to the electric field. Therefore, the liquid crystal panel becomes opaque because the light transmitted through the polarizing plate arranged on the back surface side cannot be transmitted through the polarizing plate arranged on the front surface side. At this point, the controller 6 adjusts a voltage applied between the transparent electrodes in units of pixels to change a degree of transparency in units of pixels, which allows the image to be displayed in the display region where the transparent electrode of the liquid crystal panel 2 is arranged.

The polarizing plates may be arranged such that transmission axes of the polarizing plates are parallel to each other in order to cause the crystal panel 2 to operate in a normally black mode. The liquid crystal panel becomes transparent when the electric field is applied between the two transparent electrodes between which the liquid crystal layer is interposed, whereas the liquid crystal panel becomes opaque unless the electric field is applied between the two transparent electrodes between which the liquid crystal layer is interposed.

The liquid crystal panel 2 is not limited to the liquid crystal panel, but any liquid crystal panel may be used as long as the liquid crystal panel can switch between the transparent state and the opaque state in response to a control signal from the controller 6.

Figure 2A:
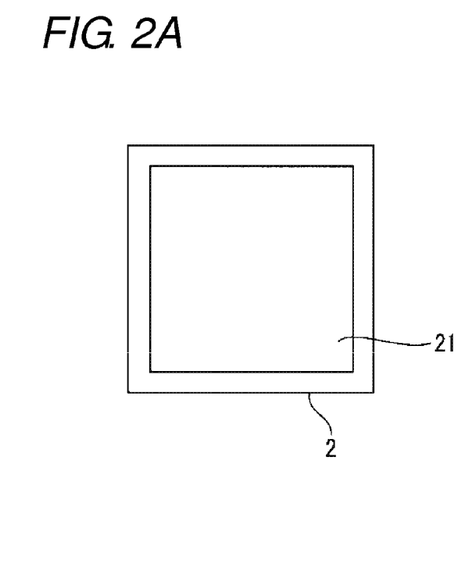
FIG. 2A is a schematic front view illustrating the display device when a liquid crystal panel is in an opaque state.
Figure 2B:
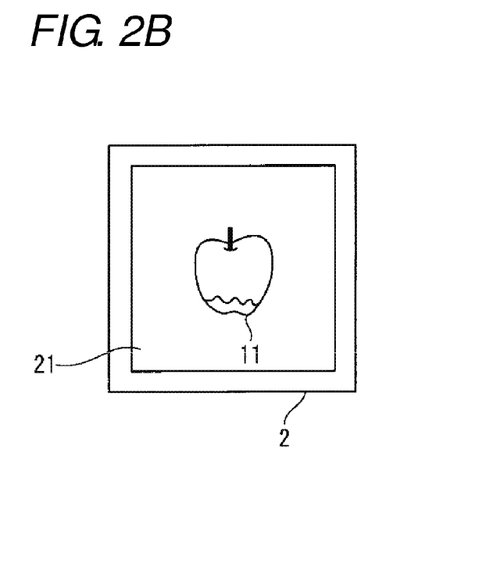
FIG. 2B is a schematic front view illustrating the display device when the liquid crystal panel is in a transparent state.

FIG. 2A is a schematic front view illustrating the display device when the liquid crystal panel is in the opaque state, and FIG. 2B is a schematic front view illustrating the display device when the liquid crystal panel is in the transparent state. As illustrated in FIG. 2A, when a display region 21 of the liquid crystal panel 2 is in the opaque state, a stereoscopic projection image 11 projected from the rear by the stereoscopic projection device 5 is hidden behind the liquid crystal panel 2, and the observer cannot visually recognize the stereoscopic projection image 11. On the other hand, as illustrated in FIG. 2B, when the display region 21 of the liquid crystal panel 2 is in the transparent state, the observer can visually recognize the stereoscopic projection image 11 at a position overlapping the display region 21 when viewing the display device 1 from the front.

When the light source 4 is lit, the light emitted from the light source 4 is diffusely propagated through the light guide plate 3, and output toward the liquid crystal panel 2, thereby illuminating the liquid crystal panel 2 with the light. The light from the stereoscopic projection device 5 is transmitted through the light guide plate 3 from the back surface side onto the liquid crystal panel 2. Therefore, the light guide plate 3 is a sheet-like member having an area larger than a display region of the liquid crystal panel 2, and the light guide plate 3 is arranged so as to face the back surface of the liquid crystal panel 2. For example, the light guide plate 3 is formed by molding resins, such as polymethylmethacrylate (PMMA), polycarbonate, and cycloolefin polymer, which are transparent to visible light.

Figure 3:
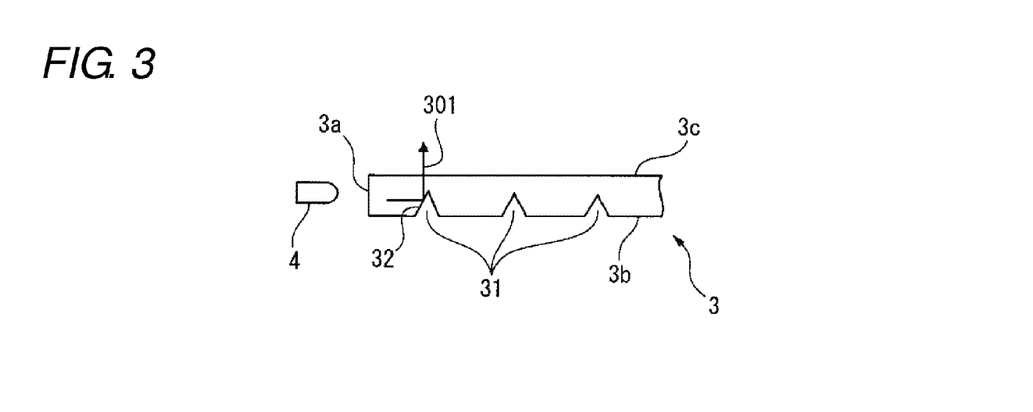
FIG. 3 is a sectional side view illustrating a light guide plate.

FIG. 3 is a sectional side view illustrating the light guide plate 3 along a propagation direction of the light perpendicularly incident on the incident surface of the light guide plate from the light source 4. An incident surface 3a is formed in one of side surfaces of the light guide plate 3 so as to face the light source 4, and the light emitted from the light source 4 is incident on the light guide plate 3 from the incident surface 3a. The light propagated through the light guide plate 3 is totally reflected by a diffusing surface 3b located on the back surface side, then output from an outgoing surface 3c facing the back surface of the liquid crystal panel 2, and incident on the liquid crystal panel 2.

In the case that the observer can visually recognize the stereoscopic projection image, the light that forms the stereoscopic projection image from the stereoscopic projection device 5 is incident on the light guide plate 3 from the diffusing surface 3b of the light guide plate 3, transmitted directly through the light guide plate 3, and output toward the liquid crystal panel 2 from the outgoing surface 3c.

In one or more embodiments of the present invention, the incident surface 3a is formed so as to be orthogonal to the diffusing surface 3b and the outgoing surface 3c. The incident surface 3a may be formed into a shape convex toward the light source 4 so as to act as a collimate lens that enhances directionality of the light incident from the light source 4.

A plurality of prisms 31 are formed in the diffusing surface 3b so as to reflect the light incident from the incident surface 3a, to uniformly output the light from the whole outgoing surface 3c, and to cause the light to be incident substantially perpendicularly on the liquid crystal panel 2.

The plurality of prisms 31 are arrayed with a predetermined pitch along the propagation direction of the incident light incident from the incident surface 3a. In the diffusing surface 3b, each prism 31 is formed as a substantially triangular groove that is extended in a direction substantially perpendicular to the propagation direction of the incident light incident from the incident surface 3a. Each prism 31 includes a reflecting surface 32 that forms a predetermined angle with respect to the diffusing surface 3b. The predetermined angle is fixed according to the propagation direction of the incident light and the direction of the light output from the light guide plate 3. In one or more embodiments of the present invention, the propagation direction of the incident light is substantially parallel to the diffusing surface 3b, and the light guide plate 3 outputs the light in the direction substantially perpendicular to the outgoing surface 3c. Therefore, each reflecting surface 32 is formed so as to form an angle of 40° to 50° with respect to the diffusing surface 3b. In this case, because the incident angle of the light incident on each reflecting surface 32 is larger than a critical angle, the incident light is totally reflected by each reflecting surface 32 as indicated by an arrow 301. Therefore, the light guide plate 3 can restrain a light amount that is not used in the illumination of the liquid crystal panel 2 in the light incident from the light source 4.

Desirably the pitch between adjacent prisms 31 is kept constant such that the intensity of the light output from the outgoing surface 3c is uniformed. For example, the prisms 31 are formed with a pitch of nearly 100 μm.

When the liquid crystal panel 2 becomes the transparent state, desirably the pattern density, which is of a ratio of an area of a region where the prism 31 is formed to an area of the diffusing surface 3b, is less than or equal to an upper limit of the pattern density at which the observer feels the visual recognition of the stereoscopic projection image projected by the stereoscopic projection device 5 through the transparent member or the observer feels that the stereoscopic projection image exists in an empty space. On the other hand, when the liquid crystal panel 2 becomes the opaque state, desirably the pattern density is greater than or equal to a lower limit of the pattern density at which the observer can visually recognize the two-dimensional image displayed on the display region of the liquid crystal panel 2 with the light emitted from the light source 4.

Alternatively, when the liquid crystal panel 2 becomes the transparent state, desirably a haze value expressing a percentage of the diffused light to the whole transmitted light is less than or equal to the upper limit of the haze value at which the observer feels the visual recognition of the stereoscopic projection image projected by the stereoscopic projection device 5 through the transparent member or the observer feels that the stereoscopic projection image exists in the empty space.

The shape of the light guide plate is not limited to the above embodiments, and any shape may be used as long as the light guide plate can transmit the light incident from the diffusing surface of the back surface side onto the outgoing surface side, and as long as the light incident from the incident surface can substantially uniformly be output from the outgoing surface.

For example, the light source 4 includes a light emitting element such as a white light emitting diode and a fluorescent light, and is arranged such that an emission surface of the light source 4 faces the incident surface 3a of the light guide plate 3. For example, the light source 4 is arranged such that the direction of the strongest emission intensity of the light source 4 is orthogonal to the incident surface 3a. For example, desirably a light emitting element having the directionality is used as the light source 4 in order to enhance use efficiency of the light. Alternatively, a collimate lens may be arranged between the incident surface 3a and the light source 4 in order to enhance the directionality of the light emitted from the light source 4. The light source 4 may include a plurality of light emitting elements. The light source 4 is lit or turned off in response to the control signal from the controller 6.

The stereoscopic projection device 5 is arranged on the back surface side of the light guide plate 3, and projects the stereoscopic projection image to a position where the observer can visually recognize the stereoscopic projection image when viewing the stereoscopic projection device 5 from the front, the position overlapping the display region of the liquid crystal panel 2.

Figure 4:
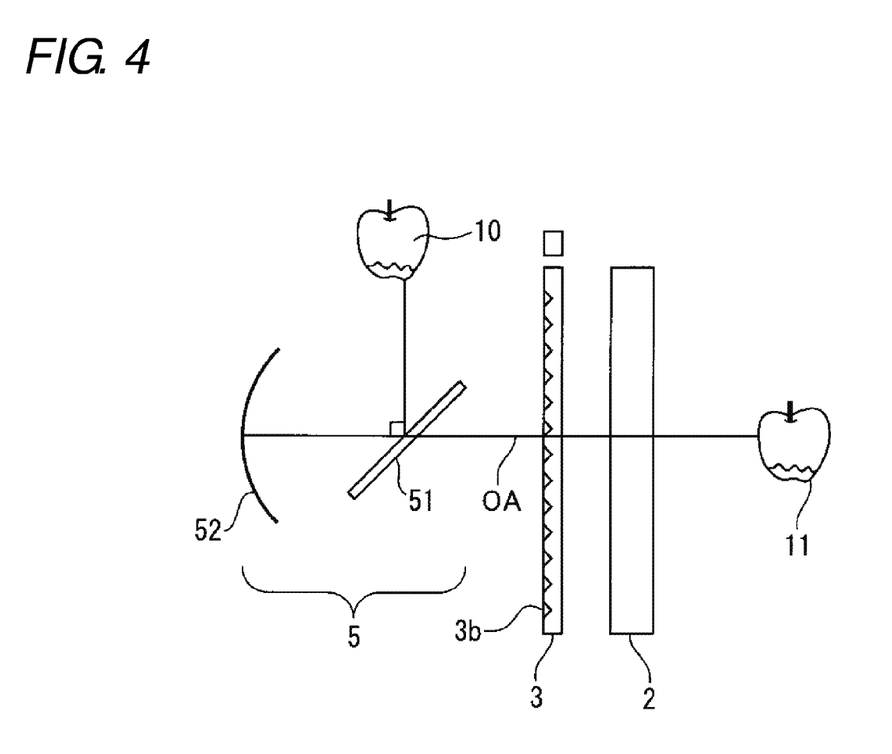
FIG. 4 is a view illustrating an example of a stereoscopic projection device.

FIG. 4 is a view illustrating an example of the stereoscopic projection device 5. Referring to FIG. 4, the stereoscopic projection device 5 includes a half mirror 51 and a concave mirror 52. In the example of FIG. 4, the concave mirror 52 is arranged on the back surface side of the light guide plate 3, and the half mirror 51 is arranged between the concave mirror 52 and the light guide plate 3 so as to form an angle of about 45° with respect to the diffusing surface 3b. The stereoscopically-projected object 10 is arranged at a position distant from a intersection position of the half mirror 51 and the optical axis OA of the concave mirror 52 by a predetermined distance in a direction, which is orthogonal to the optical axis OA and faces a surface oriented toward the side of the concave mirror 52 of the half mirror 51. Therefore, a real image of the object 10 is formed as the stereoscopic projection image 11 on the observer side with respect to the liquid crystal panel 2 by the concave mirror 52. In the stereoscopic projection device 5, the position where the stereoscopic projection image 11 is formed also varies according to the distance from the concave mirror 52 to the object 10. Specifically, as the object 10 is brought closer to the concave mirror 52, the stereoscopic projection image is projected to the position farther away from the concave mirror 52, namely, the farther position in front of the liquid crystal panel 2.

The stereoscopic projection device 5 may include an illumination light source, such as a white LED, which illuminates the object 10. The controller 6 may control the lighting or turnoff of the illumination light source. In this case, the controller 6 may turn off the illumination light source while the liquid crystal panel 2 is in the opaque state, whereas the controller 6 may light the illumination light source while the liquid crystal panel 2 is in the transparent state. Therefore, while power consumption is restrained, unevenness of illumination of the liquid crystal panel 2 is reduced because the light incident on the liquid crystal panel 2 from the stereoscopic projection device 5 through the light guide plate 3 is eliminated during the opaque state of the liquid crystal panel 2.

The object 10 itself may be formed by at least one light emitting element. In this case, the controller 6 may control the light emitting element constituting the object 10 such that the object 10 is lit only in the period during which the liquid crystal panel 2 is in the transparent state.

Figure 5:
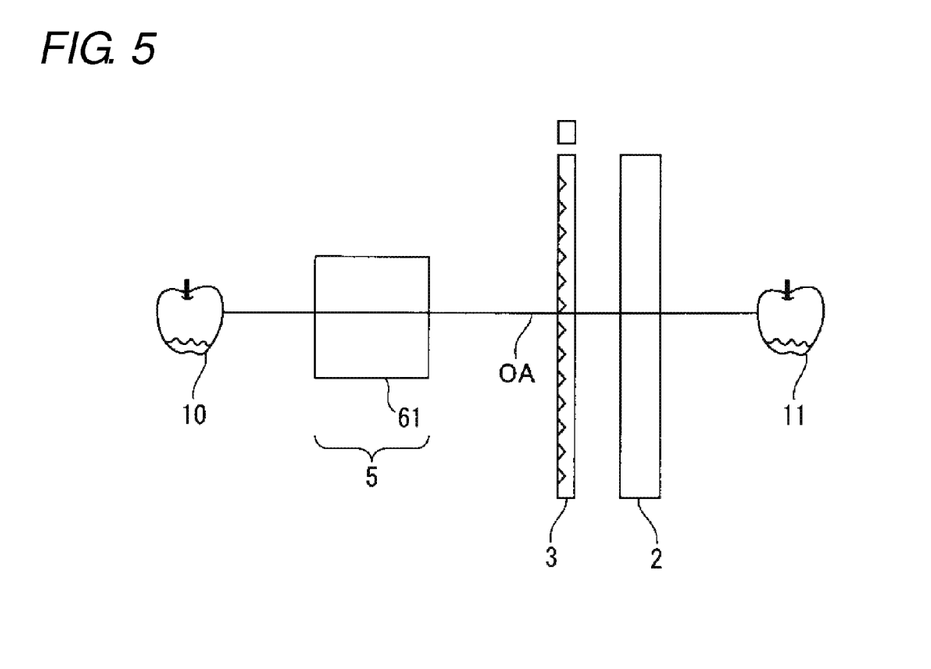
FIG. 5 is a view illustrating another example of the stereoscopic projection device.

FIG. 5 is a view illustrating another example of the stereoscopic projection device 5. Referring to FIG. 5, the stereoscopic projection device 5 includes an image forming optical system 61. In the example of FIG. 5, the image forming optical system 61 is arranged between the stereoscopically-projected object 10 and the light guide plate 3, and oriented such that the optical axis OA of the image forming optical system 61 is substantially orthogonal to the display region of the liquid crystal panel 2. Therefore, the real image of the object 10 is formed as the stereoscopic projection image 11 on the observer side with respect to the liquid crystal panel 2 by the image forming optical system 61. In the stereoscopic projection device 5, the position where the stereoscopic projection image 11 is formed also varies according to the distance from the image forming optical system 61 to the object 10. For this reason, the distance from the image forming optical system 61 to the object 10 may be adjusted according to the projection position of the stereoscopic projection image 11.

The image forming optical system 61 may be a zoom lens in which a focal distance is adjustable in response to the control signal from the controller 6. In this case, the controller 6 can change the position of the stereoscopic projection image 11 by changing the focal distance of the image forming optical system 61. For example, the controller 6 can project the stereoscopic projection image 11 to the farther position in front of the liquid crystal panel 2 with increasing focal distance of the image forming optical system 61.

A mirror may be arranged between the image forming optical system 61 and the light guide plate 3 so as to form an angle of about 45° with respect to the diffusing surface 3b of the light guide plate 3. In this case, a size in the depth direction of the display device 1 can be reduced because the image forming optical system 61 and the object 10 are arrayed along the direction substantially parallel to the diffusing surface 3b of the light guide plate 3 at the position distant by the distance from the light guide plate 3 to the mirror.

The display device 1 may include a movable stage, such as an XY-stage, as a support table for supporting the object 10 and an actuator that drives the movable stage. The controller 6 controls the actuator to drive the movable stage, whereby the position of the object 10 may be moved. Therefore, according to the position of the object 10, the controller 6 can change the position of the stereoscopic projection image 11 not only in the depth direction but also in the direction parallel to the surface of the liquid crystal panel 2.

The stereoscopic projection device 5 is not limited to the above examples, but any stereoscopic projection device may be used as long as the stereoscopic projection device can project the stereoscopic projection image to the position distant from the own device. For example, the stereoscopic projection device 5 may be one that projects the stereoscopic projection image by an integral photography system.

For example, the controller 6 includes a processor, a memory circuit, and a driving circuit of the liquid crystal panel 2. In response to a control signal of a superior control device (not illustrated), the controller 6 controls the liquid crystal panel 2, the light source 4, and the stereoscopic projection device 5. In one or more embodiments of the present invention, in a first period, the controller 6 puts the display region of the liquid crystal panel 2 into the opaque state such that the observer located on the front surface side of the liquid crystal panel 2 cannot see the stereoscopic projection image 11 projected by the stereoscopic projection device 5, and the controller 6 displays the two-dimensional image in the display region. The controller 6 lights the light source 4. On the other hand, in a second period different from the first period, the controller 6 puts the liquid crystal panel 2 into the transparent state such that the observer located on the front surface side of the liquid crystal panel 2 can see the stereoscopic projection image 11 projected by the stereoscopic projection device 5. The controller 6 turns off the light source 4.

The controller 6 alternately switches between the first period and the second period in a short time. Therefore, because of a residual image effect, the observer can visually recognize the two-dimensional image displayed on the liquid crystal panel 2 and the stereoscopic projection image 11 projected by the stereoscopic projection device 5 at the same time. For example, desirably the controller 6 sets the first period to a period shorter than a duration of a residual image of the stereoscopic projection image displayed during the second period. Similarly, desirably the controller 6 sets the second period to a period shorter than a duration of the residual image displayed during the first period. For example, desirably the controller 6 sets both the first period and the second period to a period of 1 second or less.

Desirably the controller 6 shortens the second period during which the stereoscopic projection image can be visually recognized as compared with the first period. In the second period, because the liquid crystal panel 2 is in the transparent state, sometimes the observer can visually recognize not only the stereoscopic projection image but also a main body of the stereoscopic projection device 5 through the liquid crystal panel 2 when the second period is lengthened. When being able to visually recognize the main body of the stereoscopic projection device 5, the observer focuses easily on the main body of the stereoscopic projection device 5 as compared with the stereoscopic projection image, which results in a risk that the observer does not focus on the stereoscopic projection image. Therefore, the second period is shortened to eliminate a margin in which the observer moves a focal point to the position largely deviated from the display region of the liquid crystal panel 2, which allows the controller 6 to restrain the observer from visually recognizing the main body of the stereoscopic projection device 5. For example, in the case that the liquid crystal panel 2 has a frame rate of 60 frame/s, the controller 6 may put the liquid crystal panel 2 for one frame into the transparent state every time the images for 10 frames are displayed on the liquid crystal panel 2. That is, the first period is 1/6 second and the second period is 1/60 second.

In this case, because the second period during which the stereoscopic projection image is displayed is shorter than the first period during which the image is displayed on the liquid crystal panel 2, a light amount of the stereoscopic projection image is smaller than a light amount of the image per predetermined period when the luminance of the image is equal to the luminance of the stereoscopic projection image. Therefore, possibly the observer feels the stereoscopic projection image to be dark. For this reason, desirably an average value of the luminance of the light guide plate 3 during the lighting of the light source 4 is higher than an average value of the luminance of the stereoscopic projection image. For example, desirably the luminance of the light source 4 and the luminance of the light source included in the stereoscopic projection device 5 are adjusted such that a ratio of the second period to the first period is equal to a ratio of the average value of the luminance of the light-guide plate 3 during the lighting of the light source 4 to the average value of the luminance of the stereoscopic projection image. A difference between the light amount of the image displayed on the liquid crystal panel 2 and the light amount of the stereoscopic projection image projected by the stereoscopic projection device 5 decreases in a total period of the first period and the second period, which allows the observer to easily visually recognize both the image and the stereoscopic projection image at the same time.

The controller 6 may switch between a display mode in which the observer visually recognizes the two-dimensional image displayed on the liquid crystal panel 2 and the stereoscopic projection image projected by the stereoscopic projection device 5 at the same time and a display mode in which the observer visually recognizes only one of the two-dimensional image displayed on the liquid crystal panel 2 and the stereoscopic projection image projected by the stereoscopic projection device 5. In the display mode in which only one of the two-dimensional image and the stereoscopic projection image is made visible, the controller 6 may set the first period and the second period to periods longer than the durations of the residual images of the image and stereoscopic projection image, respectively. For example, the controller 6 may set the first period and the second period to the periods of 1 second or more.

As described above, in the display device of one or more embodiments of the present invention, the controller switches between the transparent state and opaque state of the liquid crystal panel, which enables or disables the observer to visually recognize the stereoscopic projection image projected by the stereoscopic projection device behind the liquid crystal panel. Additionally, in the display device, the observer can visually recognize the two-dimensional image and the stereoscopic projection image at the same time by adjusting the period during which the two-dimensional image is displayed in the display region of the liquid crystal panel (that is, the period during which the liquid crystal panel is in the opaque state) and the period during which the stereoscopic projection image is displayed (that is, the period during which the liquid crystal panel is in the transparent state). Therefore, the display device can improve the realistic sensation.

Figure 6A:
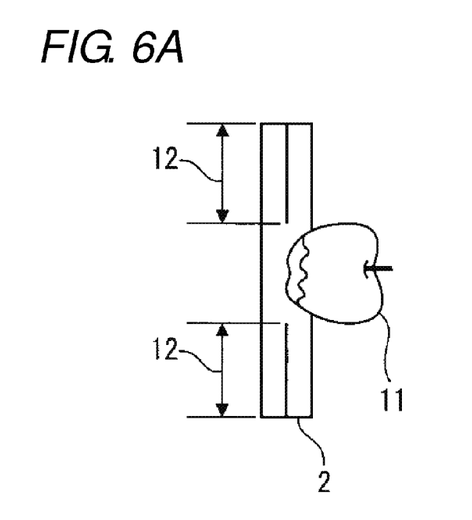
FIG. 6A is a view illustrating another example of a positional relationship between a stereoscopic projection image and the liquid crystal panel.

FIG. 6A is a view illustrating another example of a positional relationship between the stereoscopic projection image 11 and the liquid crystal panel 2. In FIG. 6A, the stereoscopic projection device 5 is omitted for convenience. In the modification of FIG. 6A, the stereoscopic projection device 5 is adjusted such that the stereoscopic projection image 11 projected by the stereoscopic projection device 5 overlaps the liquid crystal panel 2 in the depth direction. Thereby, the two-dimensional image displayed on the liquid crystal panel 2 and the stereoscopic projection image 11 can be continuously visually recognized, so that the display device enables performance as if the object projected as the stereoscopic projection image flies out from a display screen of the liquid crystal panel 2.

In the display region of the liquid crystal panel 2, the controller 6 may put only a first partial region including a part, which overlaps the stereoscopic projection image when viewed from the front, into the transparent state, and put a partial region 12 other than the first partial region into the opaque state, thereby displaying the two-dimensional image. In this case, the observer focuses easily on the stereoscopic projection image 11 because the observer can continuously visually recognize the two-dimensional image displayed in the region 12 in the opaque state (hereinafter, simply referred to as an opaque region) and the stereoscopic projection image 11. As a result, the display device can make the stereoscopic projection image appear as a more natural image. In the modification of FIG. 6A, in the display device, the stereoscopic projection image and the two-dimensional image are simultaneously displayed by switching between the transparent state and the opaque state according to the position of the display region. Therefore, it is not necessary to switch between the transparent state and the opaque state of the liquid crystal panel 2 by a time-division manner.

Figure 6B:
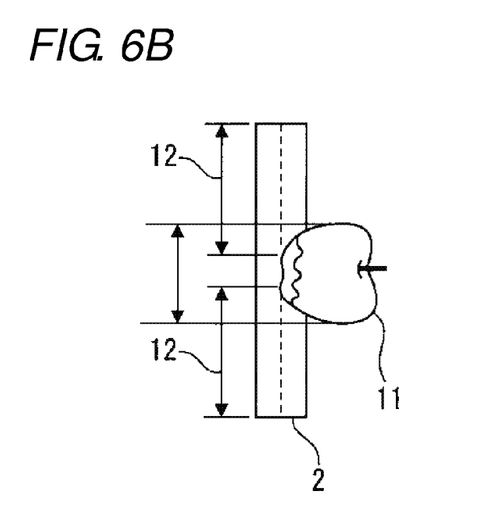
FIG. 6B is a view illustrating another example of a positional relationship between the stereoscopic projection image and a region that becomes an opaque state.

As illustrated in FIG. 6B, the opaque region 12 and the stereoscopic projection image 11 may at least partially overlap each other. In this case, even if the observer moves an observing point to see the display device from an oblique direction, the display device can prevent the observer from visually recognizing the back surface side of the liquid crystal panel 2 through the part in which the stereoscopic projection image 11 is not displayed in the first partial region in the transparent state.

The controller 6 may decrease the luminance of the two-dimensional image displayed in the first partial region as compared with the luminance of the region other than the first partial region without completely putting the first partial region into the transparent state in the display region of the liquid crystal panel 2. At this point, the controller 6 may put the two-dimensional image displayed in the first partial region into a uniformly black image within a range where the first partial region does not become the perfect opaque state. Therefore, the environmental light from the back surface of the liquid crystal panel 2 is blocked by the liquid crystal panel 2, so that the stereoscopic projection image can easily be seen in the display device.

According to another modification, any display panel may be used as long as the display panel can switch between the transparent state and the opaque state. For example, a transparent organic EL panel may be used as the display panel. In this case, because the transparent organic EL panel emits the light by itself to become the opaque state, the light source that illuminates the display panel through the light guide plate and the light guide plate may be eliminated.

The display device of the above embodiment and the modifications thereof may be mounted on game machines such as a pachinko game machine and a reel type game machine.

Figure 7:
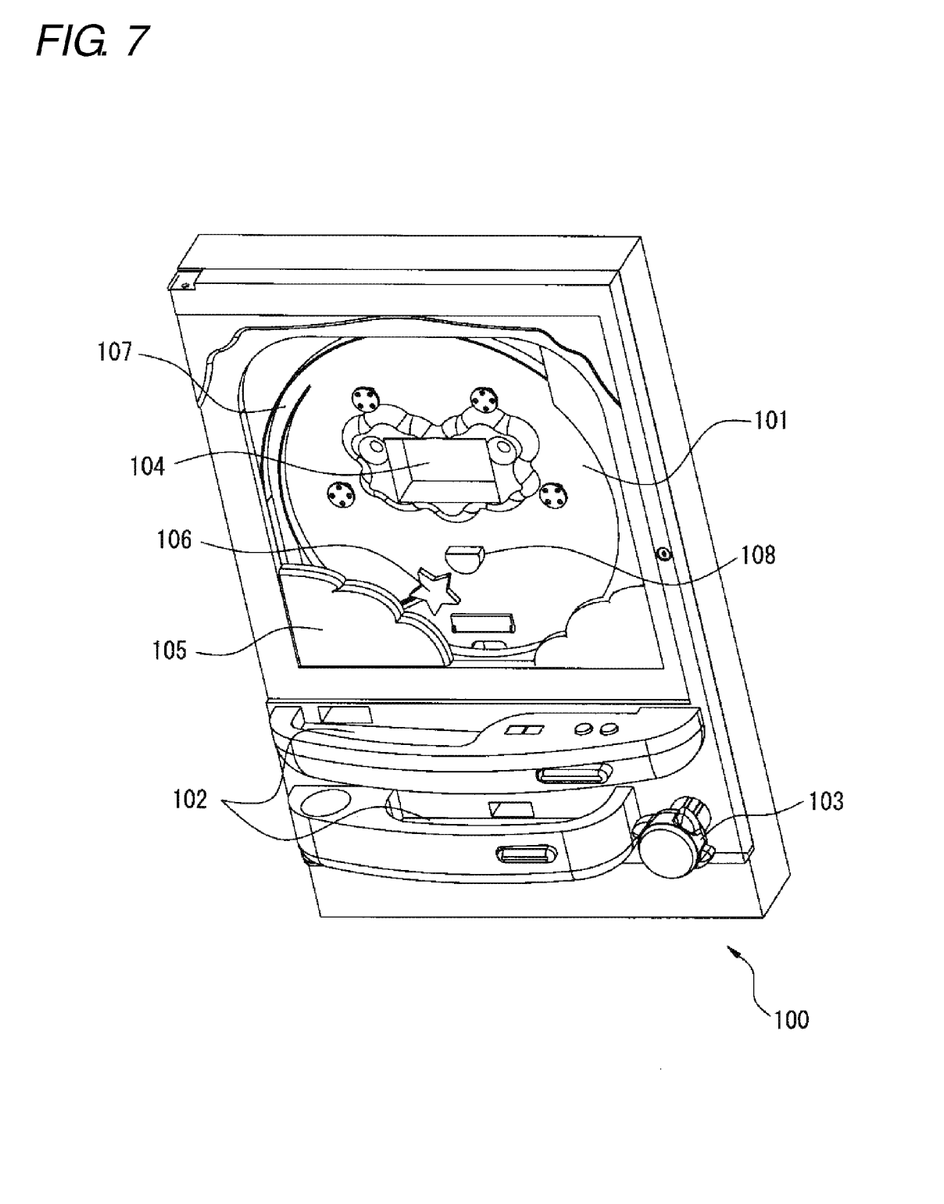
FIG. 7 is a schematic perspective view illustrating a pachinko game machine including the display device of one or more embodiments of the present invention, when the pachinko game machine is viewed from a player side.

FIG. 7 is a schematic perspective view illustrating a pachinko game machine including the display device of one or more embodiments of the present invention, when the pachinko game machine is viewed from a player side. As illustrated in FIG. 7, the pachinko game machine 100 includes a game board 101 that is of a game machine body provided in a most region from the top to a central portion, a ball receiving unit 102 provided below the game board 101, an operation unit 103 provided with a handgrip, and a display device 104 provided in the substantial center of the game board 101.

For the purpose of the performance of the game, the pachinko game machine 100 includes a fixed accessory unit 105 provided in a lower portion of the game board 101 in the front surface of the game board 101 and an accessory unit 106 arranged between the game board 101 and the fixed accessory unit 105. A rail 107 is arranged in a lateral surface of the game board 101. Many obstacle nails (not illustrated) and at least one winning device 108 are provided on the game board 101.

In the operation unit 103, a game ball is launched with a predetermined force from a launching device (not illustrated) according to a turning amount of the handgrip operated by the player. The launched game ball moves upward along the rail 107, and drops among the many obstacle nails. When a sensor (not illustrated) senses that the game ball enters one of the winning devices 108, a main control circuit (not illustrated) provided in the back surface of the game board 101 delivers a predetermined number of game balls to the ball receiving unit 102 through a game ball delivering device (not illustrated) according to the winning device 108 that the game ball enters. The main control circuit drives the display device 104 through a performance CPU (not illustrated) provided in the back surface of the game board 101.

The display device 104 is an example of the display device of the one or more embodiments of the present invention and modifications thereof, and attached to the game board 101 such that the front surface side of the liquid crystal panel is oriented toward the player. The display device 104 displays the two-dimensional image and the stereoscopic projection image such that the player simultaneously views the two-dimensional image and the stereoscopic projection image. In response to a control signal from the performance CPU in accordance with the game state, a controller of the display device 104 may switch between a mode in which one of the two-dimensional image and the stereoscopic projection image is displayed and a mode in which both the two-dimensional image and the stereoscopic projection image are displayed.

Thus, those skilled in the art can make various changes according to the above embodiments without departing from the scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A display device comprising:
a display panel that switches a display region of a two-dimensional image between a transparent state in which the display region is transparent and the two-dimensional image is not displayed, and an opaque state in which the display region is opaque and the two-dimensional image is displayed;
a stereoscopic projection device arranged on a back surface side of the display panel; and
a controller that puts the display region of the display panel into the opaque state in a first period, and puts a region of the display region of the display panel into the transparent state in a second period different from the first period,
wherein the stereoscopic projection device projects a stereoscopic projection image to a position overlapping the display region of the display panel when viewed from a front surface side,
wherein the region overlaps at least the stereoscopic projection image,
wherein the controller alternately switches between the first period and the second period,
wherein the first period is shorter than a duration of a residual image of the stereoscopic projection image projected in the second period, and
wherein the second period is shorter than a duration of a residual image of the two-dimensional image displayed in the first period.

2. The display device according to claim 1, wherein the controller lengthens the first period as compared with the second period.

3. The display device according to claim 2, wherein luminance of the stereoscopic projection image projected by the stereoscopic projection device is higher than luminance of the two-dimensional image displayed on the display panel.

4. The display device according to claim 1,
wherein the controller puts a first partial region of the display region of the display panel into the transparent state,
wherein the first partial region includes a part overlapping the stereoscopic projection image, and puts a partial region other than the first partial region of the display region into the opaque state, and
wherein the stereoscopic projection device projects the stereoscopic projection image to a position overlapping the display panel in a depth direction.

* * * * *